United States Patent
Kaczorowski

(10) Patent No.: US 7,589,471 B2
(45) Date of Patent: *Sep. 15, 2009

(54) SYSTEM FOR PRE-INDICATION OF MOTOR VEHICLE HID LAMP FEATURE

(75) Inventor: Lance G. Kaczorowski, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 66 days.

This patent is subject to a terminal disclaimer.

(21) Appl. No.: 11/551,279

(22) Filed: Oct. 20, 2006

(65) Prior Publication Data

US 2008/0185966 A1 Aug. 7, 2008

(51) Int. Cl.
*B60Q 1/14* (2006.01)
(52) U.S. Cl. .................. 315/77; 315/82; 307/10.8
(58) Field of Classification Search ............ 315/77, 315/82; 307/10.1, 10.8
See application file for complete search history.

(56) References Cited

U.S. PATENT DOCUMENTS

| | | | |
|---|---|---|---|
| 4,739,482 A | 4/1988 | Wrigge | |
| 5,592,395 A | 1/1997 | Braun et al. | |
| 6,043,614 A | 3/2000 | Tessnow et al. | |
| 6,301,531 B1 | 10/2001 | Pierro et al. | |
| 6,356,822 B1 | 3/2002 | Diaz et al. | |
| 6,426,694 B1 | 7/2002 | Larson | |
| 6,427,101 B1 | 7/2002 | Diaz et al. | |
| 6,430,485 B1 | 8/2002 | Hullinger | |
| 6,430,486 B1 | 8/2002 | Diaz et al. | |
| 6,459,969 B1 | 10/2002 | Bates et al. | |
| 6,480,105 B2 | 11/2002 | Edwards | |
| 6,539,296 B2* | 3/2003 | Diaz et al. | 701/33 |
| 6,650,977 B2 | 11/2003 | Miller | |
| 6,671,594 B2 | 12/2003 | Miller | |
| 6,975,077 B2 | 12/2005 | Izumi et al. | |
| 2003/0102962 A1* | 6/2003 | Flory, IV | 340/309.16 |
| 2003/0117267 A1* | 6/2003 | Tang et al. | 340/5.72 |
| 2006/0082330 A1 | 4/2006 | Montante | |
| 2008/0042820 A1* | 2/2008 | Larson et al. | 340/457.4 |

OTHER PUBLICATIONS

U.S. Appl. No. 11/464,881, filed Aug. 16, 2006, Larson et al.
Interpower Co., Ltd, "HID-X5 6000 Technical Report," Aug. 2003, http://www.e-interpower.com.

* cited by examiner

*Primary Examiner*—Douglas W Owens
*Assistant Examiner*—Jianzi Chen
(74) *Attorney, Agent, or Firm*—Jeffrey P. Calfa; Mark C. Bach

(57) ABSTRACT

Vehicle high intensity discharge lamps are available with three wire ballasts which emit a signal indicating proximate shutdown of the ballast and thus failure of the bulb energized by the ballast. The signal provides indication to a vehicle electrical controller which can be relayed to a remote facility which schedules replacement of the bulb.

2 Claims, 3 Drawing Sheets

US 7,589,471 B2

SYSTEM FOR PRE-INDICATION OF MOTOR VEHICLE HID LAMP FEATURE

BACKGROUND OF THE INVENTION

1. Technical Field

The present invention relates generally to commercial motor vehicles and more particularly to an automated system for indicating imminent failure of a high intensity discharge lamp.

2. Description of the Problem

Metal halide high intensity discharge (HID) lamps have made great inroads in automobile applications in recent years, but have not proven quite so popular in truck and heavy duty commercial vehicle applications. Traditionally no provision has been made for predicting lamp failure in vehicles because of the wide statistical variance in occurrences of failure. However, three wire HID ballasts generate a signal on one line which varies with ballast age and relative imminence of ballast shutdown.

SUMMARY OF THE INVENTION

According to the invention there is provided a high intensity discharge lamp system for a vehicle incorporating ballasts with three wires. One of the wires carries a signal indicating proximate shutdown of the ballast and thus failure of the bulb energized by the ballast. The signal provides indication to a vehicle electrical controller which can be relayed to a remote facility which schedules replacement of the bulb.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
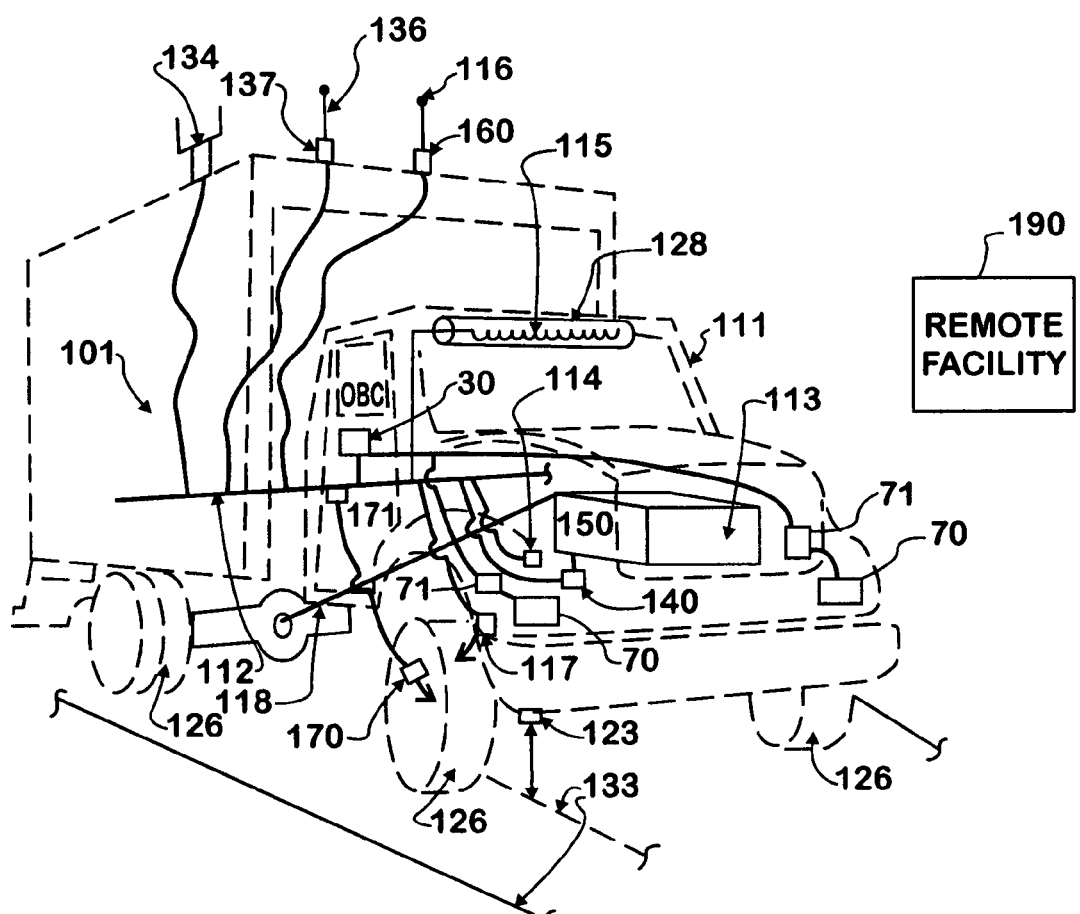
FIG. 1 is a perspective view of a commercial vehicle equipped with lighting systems with which the present invention is advantageously employed.

Referring to the drawings and in particular referring to FIG. 1 a motor vehicle internal electrical communication backbone 112, typically an SAE J1939 bus, is electrically engaged to provide a communication path between various electronic devices and controllers as part of a vehicle onboard electrical system VOS 101. The vehicle 111 has an engine 113 engaged to a transmission 114. The transmission is engaged to a drive train 118 for driving the wheels 126. The engine 113 is controlled and monitored by an engine electronic control module (ECM) 140 that is electrically engaged to the communication backbone 112. The engine ECM 140 may receive and communicate status of the engine and auxiliary equipment including but not limited to engine performance, engine coolant parameters, engine oil system variables, air intake quality, and other monitored variables. The transmission 114, if automatic or semi-automatic, may be controlled and monitored by a transmission electronic control module 150 that is electrically engaged to the communication backbone 112. The vehicle 111 has an onboard computer (OBC) 30 which is connected to the communications backbone 112 and which acts as the lead message arbitrator or lead controller for the vehicle 111.

The OBC 30 collects input data and sends requests from and to a communication system for relay to a remote facility 190 which collects and analyses fleet data for scheduling of maintenance and other functions, generally termed in the art "telematics". The communication system may take a number of forms, such as a satellite access antenna 115 that may be included in a sun visor 128 or a cellular phone antenna 116 with a phone transceiver 160. The communication system may additionally be any vehicle to land method and equipment.

On-board computer system 30 receives data inputs from a number of sources, while some vehicle systems may be under its direct control. In the example vehicle of the illustration the wheels 126 include anti-lock (ABS) brakes. The anti-lock brakes may be controlled by an anti-lock brake electronic control module (ABS ECM) 117. The ABS ECM 117 is electrically engaged to the communication backbone 112 and like the other ECMs provides status of the system to the OBC 30. A tire pressure sensor 170 is mounted on each wheel. The tire pressure sensor 170 measures each tires pressure and sends a radio signal to a receiver 171 that is electrically engaged to the communication backbone 112. Tire pressure is an indicator of tire wear, the need for a pressure adjustment, or vehicle loading depending on the pressure distribution across the tires and a specific vehicle history maintained by either the OBC 30 or the remote facility 190. An electronic odometer may also be tied to the communication backbone 112 to provide input of miles traveled to the OBC 30. A navigation system such as those based on GPS and Dead Reckoning may be installed and engaged to the communication backbone 112 with an appropriate antenna 136 and transceiver 137 for providing input of the vehicle 111's geographic position. The above mentioned ECMs and sensors are just examples of specific vehicle inputs providing a specific vehicle status.

Other sensors on the vehicle 111 provide the VOS 101 with indications of external conditions that may be valuable to other vehicles communicating with remote facility 190. Some examples include a road ice sensor 123. The road ice sensor 123 can be a simple as an infrared transceiver directed downwards to a road surface 133. Road surfaces 133 covered with ice, snow, black ice, or water, or dry will give different infrared reflective signals back to the road ice transceiver 123. The road ice transceiver 123 is also electrically engaged to the communication backbone 112.

The lead message arbitrator or lead electronic controller may be programmed for communication with the off board communication network through the communication means engaged to the internal communication backbone 112. The lead electronic controller is also programmed for transmitting an indication of an abnormal condition in one of the monitored vehicle components to the off board communication network 100 through the vehicle internal communication backbone 112 and the communication means. The lead electronic controller may be programmed for receiving instructions for action to address the abnormal condition from the off board network 100 through the communication means. The lead electronic controller may also be programmed for notifying a driver of the vehicle 111 of driver actions of the received instructions from the off board network 100.

Of present interest are the vehicle's headlamps 70, which are under the direct control of the OBC 30 through ballasts 71. Vehicle headlamps 70 are metal halide type high intensity discharge (HID) lamps, which are energized by the ballasts 71. The ballasts 71 respond to control signals applied by the OBC 30. A representative example of such a ballast is described in U.S. Pat. No. 6,975,077. Metal halide lamps are a type of arc discharge lamp with two or three ionizing media. In a typical motor vehicle application the lamp will contain trace amounts of xenon, mercury, and the metal halides of choice, for example, sodium iodide. When the lamp is cold a high voltage discharge is used which ionizes the xenon, thereby increasing the temperature of the lamp enough to vaporize the mercury, which in turn is ionized raising the temperature still further until the metal halide is vaporized and the lamp reaches a steady operating state. Lamp 70 output is controlled in various ways. In the '077 patent the frequency of the signal used to control the operating frequency of a DC to AC inverter is varied to provide the desired output signals to the lamp. In order to do this ballast control is responsive to a number of signals, most particularly current drawn by the lamp 70. In steady state operation this should be a constant for a particular beam setting. Over time however, with progressive degradation of the lamp, the current drawn will begin to fall. The rate of decline, or a specific trigger level, may be used as an indicator of impending failure. The trigger level (or rate of change) may be tailored to a chosen mean time to failure level. Ballasts are typically designed to shut down when current levels reach a certain point and thus the current level is indicative of the number of hours until such occurrence.

Figure 2:
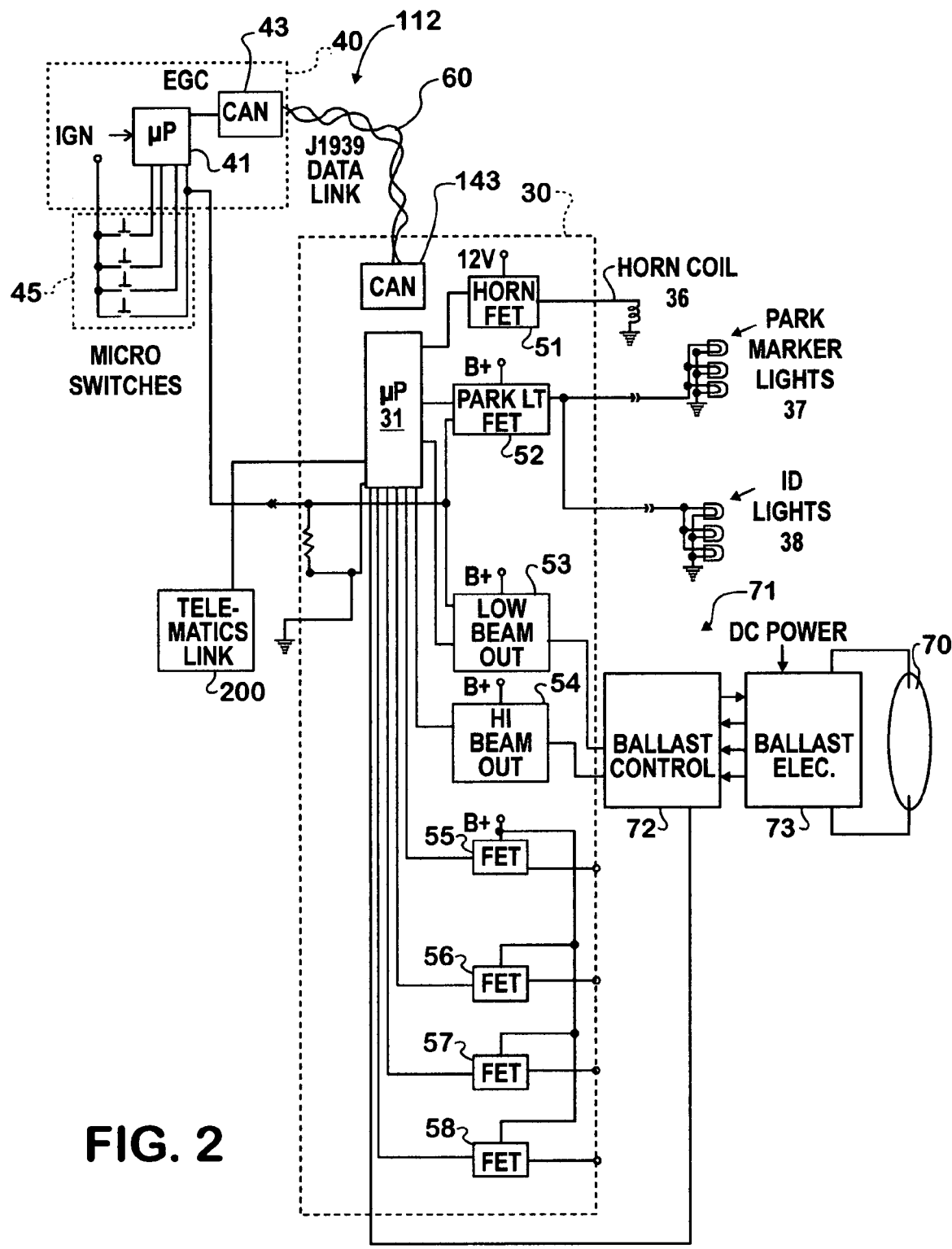
FIG. 2 is a circuit schematic for a motor vehicle lighting system and related controls.

FIG. 2 illustrates lighting pin connections for a OBC 30, which here is illustrated as an electrical system controller. OBC 30 in conventional designs directly energizes most vehicle exterior lamps (and the horn 36) by use of a series of Field Effect Transistor (FET) switches 51, 52, 53, 54, 55, 56, 57, 58. For the sake of simplicity only parking marker lights 37 are shown. Fewer than the number of FETs required are illustrated because the specific circuit element is simply repeated up to the number of lamp circuits for which support is required. Switches 53 and 54 have been taken over to provide off/on control signals to ballast unit 71, which in turn includes a ballast controller 72 and the ballast proper 73. OBC 30 is in turn connected to an electrical gauge controller (EGC) 40 over the communications backbone 112 (which is illustrated as a twisted pair cable 60 connecting controller area network (CAN) controllers 43, 143). EGC 40 is connected in turn to a set of micro-switches 45 by which a vehicle operator turns lights on and off, as detected by micro-controller 41. OBC 30 is a programmable body systems computer used to control many vehicle electrical system functions, most of which are not shown. In the past, many of these functions were controlled by switches, relays and other independently wired and powered devices. OBC 30 is based on a microprocessor 31 which executes programs and which controls switching of the plurality of power FETs 52, 55, 56, 57 and 58 used to actuate most vehicle exterior lights. The telematics link 200 is implemented over the communication system under the control of OBC 30 as already described.

To implement the present invention ballast control 72, which provides a variable frequency control signal to ballast electronics 73 and which monitors output frequency, current and voltage, supplies the current measurement to microprocessor 31 which is programmed to determine likely time to failure based on the current level. The diagram shows both the low beam and high beam control signals being applied to ballast controller 72, which implies two steady state levels of current may be reported. The particulars of implementing high and low beams however is not considered pertinent to the invention and in fact differing headlamps may be used, though doing so would be unusual.

Figure 3:
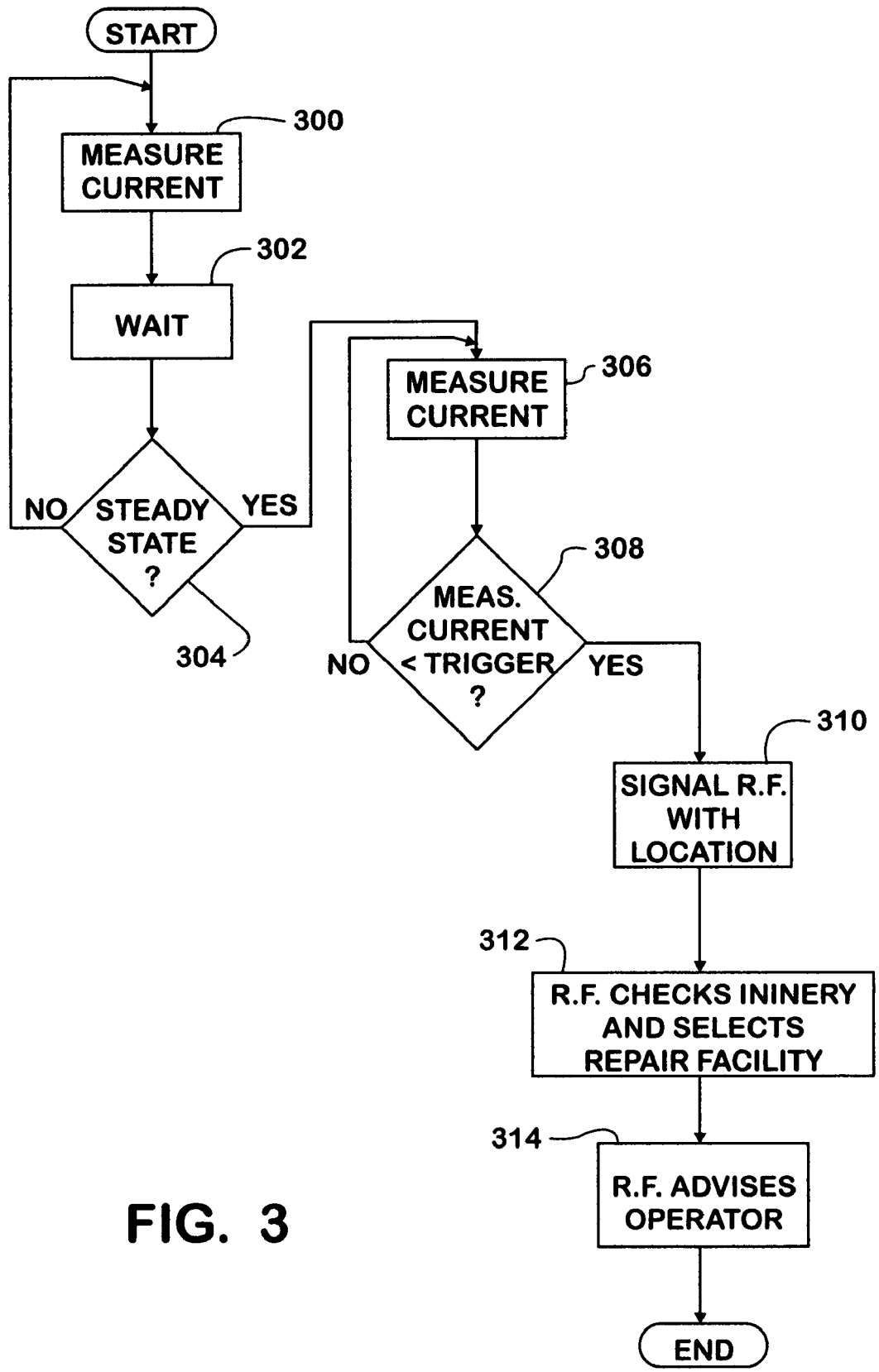
FIG. 3 is a flow chart of a program executed on the electrical system controller for implementing the invention.

FIG. 3 is a high level flow chart of the comparison tests which may be implemented on microprocessor 31 and remote telematics facility 190. Upon a request for illumination from the headlamps 70, the program begins measuring current (step 300) and comparing the measurements until the current value settles to a steady state value (step 304). A wait step 302 may be part of this operation. Once a steady state is achieved the current may again be measured (step 306) or the last measurement taken from the steady state test may be used to determine if the measured current (step 308) is less than a trigger level indicating approaching failure of the lamp. Until the trigger level is reached the test cycles. Once the trigger level is reached the remote facility 190 is signaled (step 310) along with a report of the vehicle's position. The remote facility 190 checks position and itinerary and selects a repair facility along the vehicle's scheduled route for the repair (step 312). In this way availability of the proper lamp may be assured and downtime minimized. The operator is advised (step 314) and the operation is illustrated and concluding.

The invention provides for indicating approaching failure of an HID vehicle headlamp and for providing scheduling of repair before failure occurs.

While the invention is shown in only one of its forms, it is not thus limited but is susceptible to various changes and modifications without departing from the spirit and scope of the invention.

What is claimed is:

1. A vehicle lamp system, comprising:
   high intensity discharge lamps installed on a vehicle;
   ballasts installed on the vehicle for supplying energizing current to the high intensity discharge lamps;
   programmable controller means installed on the vehicle coupled to receive indication of current drawn by each of the high intensity discharge lamps and responsive thereto for predicting an impending failure of a high intensity discharge lamp;
   a remote facility for management of a fleet including a vehicle on which the high intensity discharge lamps are installed;
   means for notifying the remote facility from the programmable controller of the impending failure; and
   program means executed on the remote facility for selecting a repair location for replacement of the lamp based on vehicle location and itinerary and returning information identifying the selected repair location to the programmable controller for access by a vehicle operator.

2. A vehicle lamp system as described in claim 1, further comprising:
   a selected trigger level for the signal indicative of impending lamp failure to give a predetermined number of hours until expected failure.

* * * * *